US007801787B2

(12) United States Patent
Jain et al.

(10) Patent No.: US 7,801,787 B2
(45) Date of Patent: Sep. 21, 2010

(54) DETERMINATION OF CUSTOMIZED INVESTING ADVICE

(75) Inventors: Kamal Jain, Bellevue, WA (US); Craig J. Mundie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 135 days.

(21) Appl. No.: 12/144,683

(22) Filed: Jun. 24, 2008

(65) Prior Publication Data

US 2009/0319439 A1    Dec. 24, 2009

(51) Int. Cl.
G06Q 40/00 (2006.01)
(52) U.S. Cl. ...................................................... 705/35
(58) Field of Classification Search ................. 235/375; 386/427; 345/1–45; 705/231; 709/200; 715/779; 725/116
See application file for complete search history.

(56) References Cited

U.S. PATENT DOCUMENTS

| | | | |
|---|---|---|---|
| 5,864,828 A | 1/1999 | Atkins | |
| 6,253,192 B1 | 6/2001 | Corlett et al. | |
| 7,050,997 B1 | 5/2006 | Wood et al. | |
| 7,177,831 B1* | 2/2007 | O'Shaughnessy et al. | 705/36 R |
| 7,373,324 B1* | 5/2008 | Engin et al. | 705/36 R |
| 7,577,597 B1* | 8/2009 | Allison et al. | 705/35 |
| 2002/0019791 A1 | 2/2002 | Goss et al. | |
| 2002/0111890 A1 | 8/2002 | Sloan et al. | |
| 2002/0147672 A1 | 10/2002 | Gaini | |
| 2002/0156710 A1 | 10/2002 | Ryder | |
| 2003/0093353 A1* | 5/2003 | Ward et al. | 705/36 |
| 2003/0120575 A1* | 6/2003 | Wallman | 705/36 |
| 2003/0208427 A1 | 11/2003 | Peters et al. | |
| 2004/0054610 A1 | 3/2004 | Amstutz et al. | |
| 2005/0015296 A1* | 1/2005 | Dougan | 705/10 |
| 2007/0130043 A1* | 6/2007 | O'Shaughnessy et al. | 705/36 R |
| 2007/0208645 A1* | 9/2007 | Hoffman et al. | 705/36 R |

FOREIGN PATENT DOCUMENTS

WO    0213097 A2    2/2002

OTHER PUBLICATIONS

New investment tool aims at setting priorities. (Marketing Strategies), Defined Contribution & Savings Plan Alert, v1, n9, p. 4, Oct. 3, 2005.*
System and Method for Selecting and Purchasing Stocks Via a Global Computer Network, Netfolio Inc, 2001.*
Scatizzi Cara, "Portfolio Management Software Programs", Date: Jul./Aug. 2007, pp. 9-21.
Sunnyvale, Calif, "Yahoo! Offers Personalized Financial Management Solution; Yahoo! Finance Money Manager Automatically Tracks, Analyzes and Manages Consumers' Personal Finances for Free", Date: Dec. 6, 2001, 6 pages, http://findarticles.com/p/articles/mi_m0EIN/is_2001_Dec_6/ai_80589457.

(Continued)

Primary Examiner—James P Trammell
Assistant Examiner—Tien C Nguyen

(57) ABSTRACT

Described herein is a system that facilitates provision of personalized investing advice to a user. The system includes a subscriber component that receives a selection of multiple financial models from the user, wherein the user may desire to receive financial data from the multiple financial models in real-time. Further, the system can include an adviser component that can receive and process financial data output by the multiple financial models and can determine customized investing advice for the user based at least in part upon the financial data output by the multiple financial models and personal investing preferences of the user.

20 Claims, 11 Drawing Sheets

OTHER PUBLICATIONS

"activebank Wealth Manager", 1 Page, http://www.finobj.com/wealth/our_solutions/activebank_Wealth_Manager.php.

"Personal Portfolio Manager 7", 2 Pages, http://www.owlsoftware.com/oppm.htm.

* cited by examiner

DETERMINATION OF CUSTOMIZED INVESTING ADVICE

BACKGROUND

Computers and networks in general, and the Internet in particular, have at least partially changed how individuals manage their finances. For instance, an individual with an Internet connection can check balances in checking accounts, savings accounts, credit cards, mortgages, automobile loans, and the like. Additionally, an individual can transfer funds from a first account to a second account with a few keystrokes and mouse clicks.

Further, an individual can research a company online and make at least a semi-educated decision regarding whether or not to invest in the company. Typically, however, an individual will not have sufficient time or expertise in analyzing financial data. Accordingly, the majority of investors use financial experts that help the individuals reach their financial goals. For instance, an individual may invest in a mutual fund, which includes multiple holdings that are selected by a mutual fund manager. More specifically, the individual may purchase shares of the mutual fund, wherein each share includes the multiple holdings, and wherein each holding makes up a certain percentage of a share of the mutual fund. In another example, an individual may hire a personal financial adviser whose job is to monitor financial markets and recommend investments to users.

There are, however, deficiencies pertaining to the aforementioned approaches to investing. For instance, a mutual fund manager attempts to optimize holdings of the mutual fund for a general population. The mutual fund manager, however, does not take into consideration the investing preferences or situations of an individual investor. For instance, an individual may be employed by a particular company and have exercised stock options while employed with the company—therefore, a significant amount of the financial health of the individual is tied to the particular company. The mutual fund manager, however, typically considers the financial well-being of the general population, and may include the particular company as a holding in the mutual fund, thereby further tying the financial health of the individual to the company. Personal financial advisers can consider the investing preferences of the individual, but typically only those with significant wealth are able to use such personal financial advisers. Furthermore, personal financial advisers often charge a relatively large fee for their advice.

SUMMARY

The following is a brief summary of subject matter that is described in greater detail herein. This summary is not intended to be limiting as to the scope of the claims.

Described herein are various technologies pertaining to wealth management. More particularly, determination and output of customized investing advice is described herein. A user can subscribe to one or more financial models that, for instance, can reside and be maintained on one or more servers. The financial models can be configured to output financial data that may be received at a personal computing device of the user. The financial models can include a human model, which can be configured to output investing advice by a financial expert, such as a mutual fund manager (e.g., trades recommended by the mutual fund manager can be output by human model). The financial models may also include a data model, which can be configured to output financial data from a data source, such as values of stock traded on the New York Stock Exchange. The financial models may additionally include computational models that can output processed data (e.g., financial data that has been subject to data processing).

The financial data from the financial models can be received and processed together with personal investing preferences of the user to determine customized investing advice for the user. For instance, the personal investing preferences can include restrictions on purchasing a particular stock, risk tolerance of the user, current investment portfolio of the user, etc. The personal investing preferences, for instance, may be stored in a data store on the aforementioned client computing device. Furthermore, the processing of the financial data and personal investing preferences may occur on the client computing device, wherein such processing can be executed as a background task. The customized investing advice may then be output to a computer-readable medium, a graphical user interface, a printer, etc.

Furthermore, the user can assign trust points to one or more selected financial models. Financial data received from a financial model that has been assigned a relatively large number of trust points can be weighted more heavily when such data is processed than financial data received from a financial model that has been assigned a relatively small number of trust points. Thus, for instance, a user can receive financial advice from multiple financial experts (by way of the financial models), and the user can further indicate which financial expert is a favorite of the user.

In accordance with another aspect, entities that correspond to financial models that output financial data can be provided with monies for such data. For instance, a user can select a particular financial model, and the financial model may charge to a particular yearly fee. The user can pay such fee in return for receiving financial data from the selected financial model.

Other aspects will be appreciated upon reading and understanding the attached figures and description.

DETAILED DESCRIPTION

Figure 1:
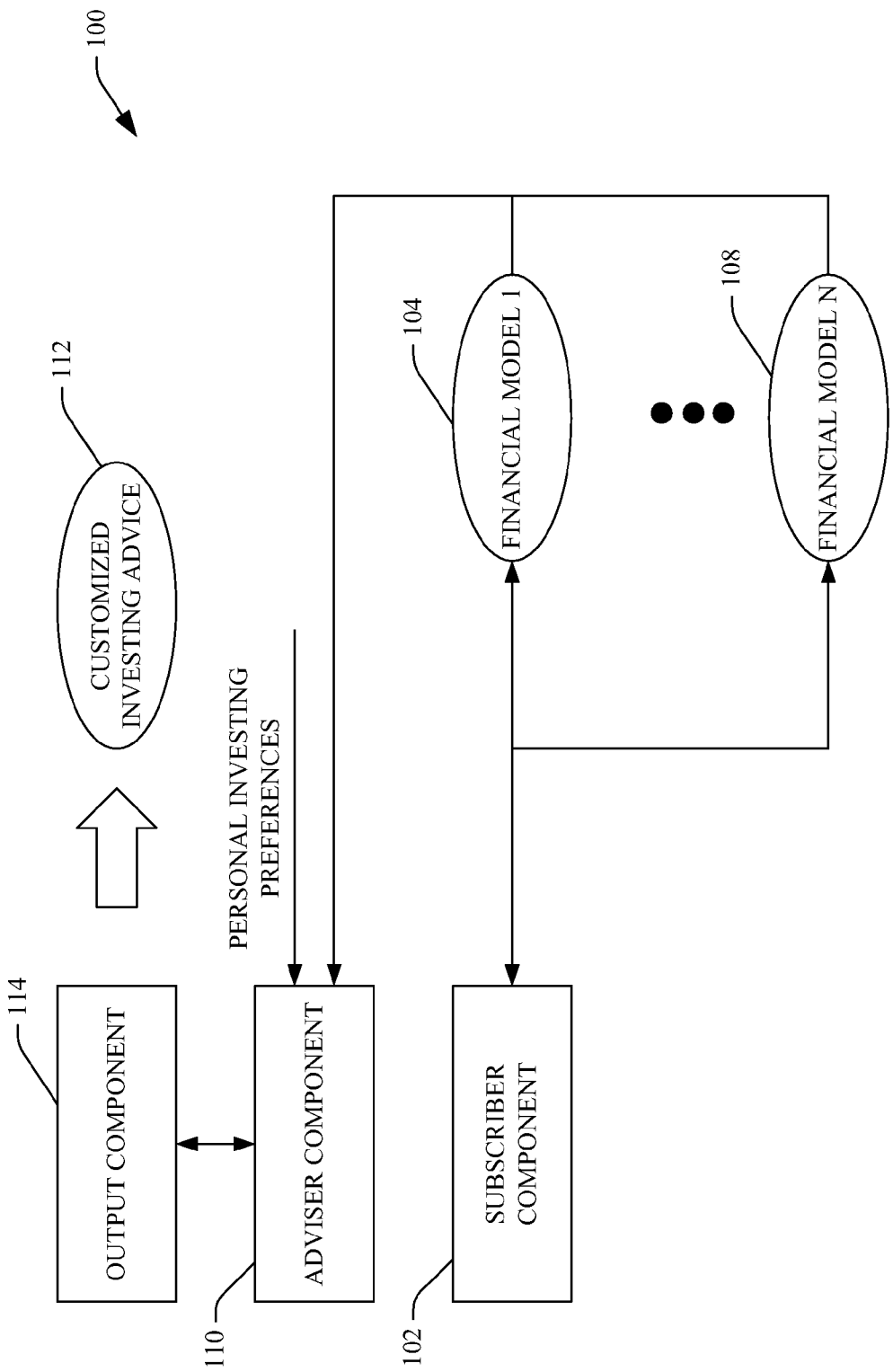
FIG. 1 is a functional block diagram of an example system that facilitates determining and outputting customized investment advice for a user.

Various technologies pertaining to wealth management in general, and personalized wealth management in particular, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates provision of personalized investing advice to a user is illustrated. The system 100 includes a subscriber component 102 that receives a selection of multiple financial models 104-108 from a user. For instance, the financial models 104-108 may be configured to output financial data, and the user may desire to receive financial data from the multiple financial models in real-time. Pursuant to an example, the user may select the financial models 104-108 from a plurality of available financial models (e.g., the plurality of available financial models may be depicted to a user by way of a graphical user interface, and the user may select the financial models 104-108 from which data is desirably received).

Pursuant to an example, the financial models 104-108 may include a human model, wherein the human model can model and output investment advice provided by a financial expert. For instance, the human model can be configured to output financial advice that corresponds to financial advice provided by a particular mutual fund manager. Such advice may include advice to invest in one or more securities, advice to sell one or more securities, advice to trade a first security for a second security, advice to include a particular collection of securities in a portfolio at certain percentages of the portfolio, and other advice. In an example, the financial data output by a human model that corresponds to a mutual fund manager can correspond to trades made by the mutual fund manager in real-time. Thus, the human model outputs financial data as the mutual fund manager changes holdings of the mutual fund. Therefore, for instance, if the user researches mutual funds and locates a particular fund that has performed well, the user can select the fund (and therefore select the fund manager) and subscribe to a human model corresponding to the fund manager. Of course, human models can model investment advice by financial experts other than mutual fund managers, such as a hedge fund manager, a professional investor, a television personality, and/or the like.

Additionally or alternatively, the financial models 104-108 may include a data model that models selected investing data (e.g., the data model can be configured to output data pertaining to market conditions in real-time). For instance, a data model can output changes in stock price as such changes occur (e.g., can model values of stocks traded on the New York Stock Exchange, can model values of stocks traded on NASDAQ, can model international stock markets, . . . ). Furthermore, a data model can be configured to output data pertaining to a particular security. For instance, the user may have an interest in a certain company, and a data model may be configured to output financial data pertaining to the certain company in real-time (e.g., as the financial data is released). In such an example, data output by the data model may include reported earnings of the company, value of stock of a company, volume of trades, amongst other financial information.

Additionally or alternatively, the financial models 104-108 may include a computational model that receives financial data and processes such data and thereafter outputs financial data (e.g., projections, trends, . . . ) based upon the processed data. In an example, a computational model can be configured to receive financial data from companies in a particular sector, and can process such data to generate projections or note trends in the data pertaining to the particular sector. Various algorithms have been developed to analyze particular financial data, and such algorithms may be included in one or more computational models.

The system 100 additionally includes an adviser component 110 that receives financial data output by the multiple financial models 104-108 selected by the user. Furthermore, the adviser component 110 can access or receive personal investing preferences of the user. The adviser component 110 can process the financial data output by the multiple financial models 104-108 and can determine customized investing advice 112 for the user based at least in part upon the financial data output by the multiple financial models 104-108 and the personal investing preferences of the user. An output component 114 can output the customized investing advice 112. For instance, the output component 114 can output the customized investing advice 112 to a graphical user interface, to a computer-readable medium, to a microphone, to a printer, or other suitable device.

The personal investing preferences received by the adviser component 110 may include prohibitions on purchasing particular securities, indications that a security should not make up more than a threshold percentage of an investment portfolio of the user, risk tolerance of the user, current financial holdings of the user, current debt of the user, annual income of the user, desired retirement age of the user, whether the user has any children, and any other information that may be pertinent to the financial health of the user. The adviser component 110 can analyze the personal investing preferences when processing the financial data received from the financial models 104-108. Thus, the customized investing advice 112 that is determined by the adviser component 110 and output by the output component 114 is, in fact, customized for the user based at least in part upon the financial models selected by the user and personal investing preferences of the user.

The adviser component 110 may use any suitable algorithm, function, model, thread of execution, or the like when processing financial data output from the financial models 104-108 and/or the personal investing preferences. For instance, the adviser component 110 may use or include a rules engine that applies particular processing rules if certain parameters are observed. For instance, if the personal investing preferences of the user include a prohibition on investing in a certain company, and upon processing data from the financial models 104-108 the adviser component 110 determines that investing a particular amount of money in the certain company is desirable, a rule can be accessed that automatically distributes the particular amount of money to other investments deemed to be desirable by the adviser component 110.

In another example, the adviser component 110 may include and/or employ one or more machine learning algorithms, models, functions, etc. For instance, the adviser component 110 may include and/or employ fuzzy logic, a Bayesian network, a regression tree, a k-nearest neighbor algorithm, a support vector machine, a neural network, other suitable algorithm/model/function, and/or a suitable combination thereof in connection with determining the customized investing advice 112. For instance, a boosted machine learning model can be used by the adviser component 110 in connection with determining the customized investing advice 112. In still yet another example, the adviser component 110 may use a suitable combination of machine learning and rules in connection with determining the customized investing advice 112.

Figure 2:
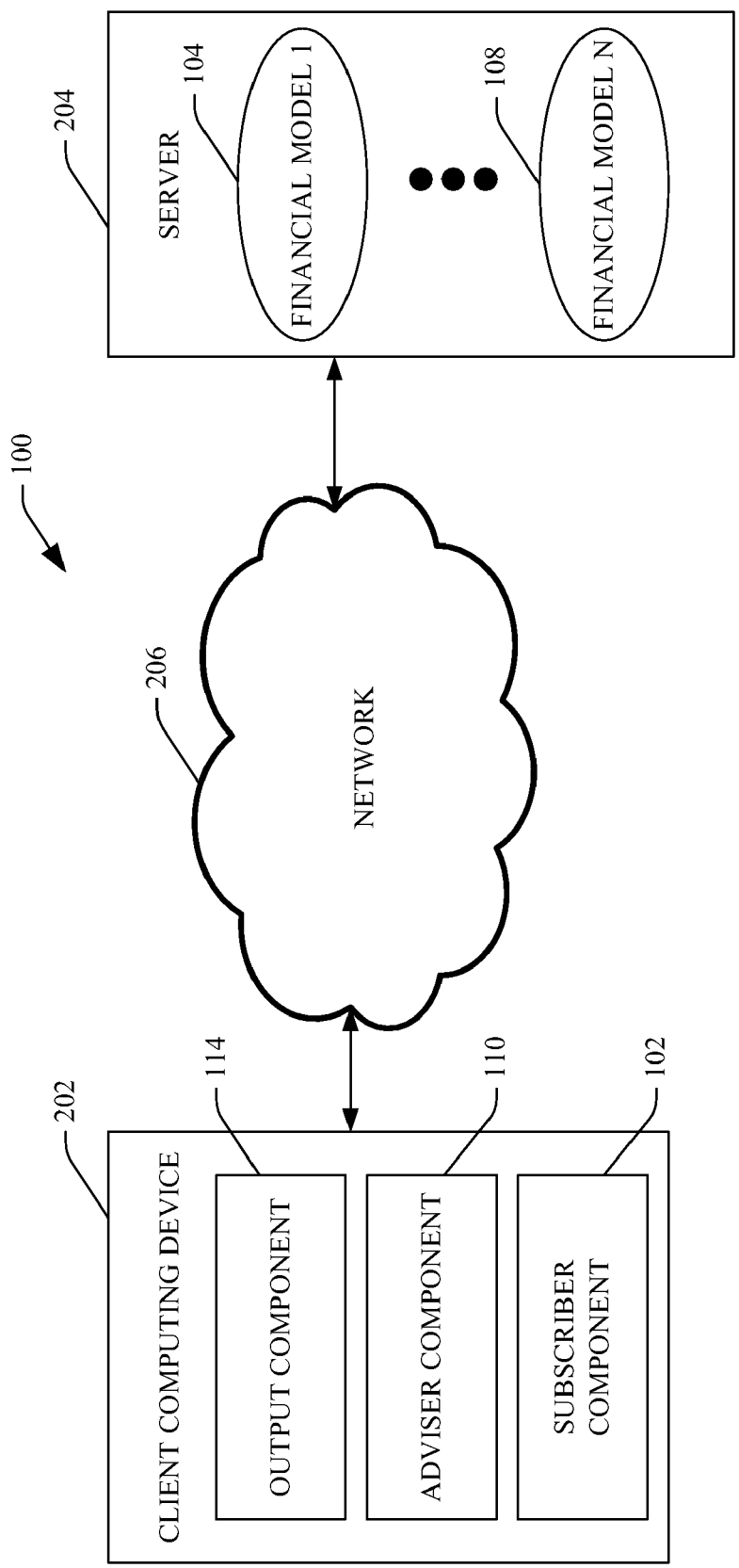
FIG. 2 is an example computing environment that illustrates that processing of data to determine customized investing advice may occur on a client computing device.

With reference now to FIG. 2, an example computing environment 200 in which aspects described herein may be practiced is illustrated. The computing environment 200 includes a client computing device 202. The client computing device 202 may be a personal computer, a laptop computer, a personal digital assistant, a gaming console, a portable telephone, or other suitable personal computing device. The client computing device 202 may include the subscriber component 102, the adviser component 110, and the output component 114 which act in conjunction as described above.

The example computing environment 200 additionally includes a server 204, wherein the server 204 is illustrated as including the financial models 104-108. It is to be understood, however, that the server 204 may include a financial model and that a different server (not shown) may include a financial model. Furthermore, a financial model may be distributed across numerous servers.

In an example, the subscriber component 102 can receive a request from a user to subscribe to one or more of the financial models 104-108 resident on the server 204. The subscriber component 102 can access the server 204 by way of a network 206, such as the Internet, and can subscribe to the one or more of the financial models 104-108. Once the user has subscribed to the one or more financial models 104-108 by way of the subscriber component 102, the adviser component 110 can receive financial data output by the one or more financial models 104-108. Pursuant to an example, the one or more financial models 104-108, once subscribed to by way of the subscriber component 102, can push data to the adviser component 110. Therefore, as financial data is determined at the one or more financial models 104-108, such financial data can be automatically output to the adviser component 110 in real-time. In another example, the adviser component 110 can be configured to pull data from the one or more financial models 104-108 that are subscribed to by the user (e.g., by way of the subscriber component 102). For instance, the adviser component 110 can pull data from the one or more financial models 104-108 when a processor on the client computing device 202 is executing a low priority task.

Upon receipt of financial data output by the one or more financial models 104-108, the adviser component 110 can process such data in connection with determining customized investing advice for the user. Pursuant to an example, the adviser component 110 can execute as a background application on the client computing device 202.

The output component 114 can be configured to output the customized investing advice such that it can be reviewed by the user. For instance, the output component 114 can be configured to periodically output the customized investing advice (e.g., once a day). In another example, the adviser component 110 can determine a value of information in connection with the customized investing advice, and the output component 114 can be configured to output the customized investing advice such that it can be reviewed by the user when the value of information is above a threshold. In an example, the adviser component 110 can advise purchasing a particular security, and may predict (with a relatively high confidence) that purchasing such security will result in a relatively large short-term gain (e.g., 15% over three days). Accordingly, it may be imperative that the user receives such customized investing advice in a timely manner prior to the value of the security significantly rising. As such, the output component 114 may be configured to output the customized investing advice in a timely manner in an attempt to substantially maximize gains for the user.

Figure 3:
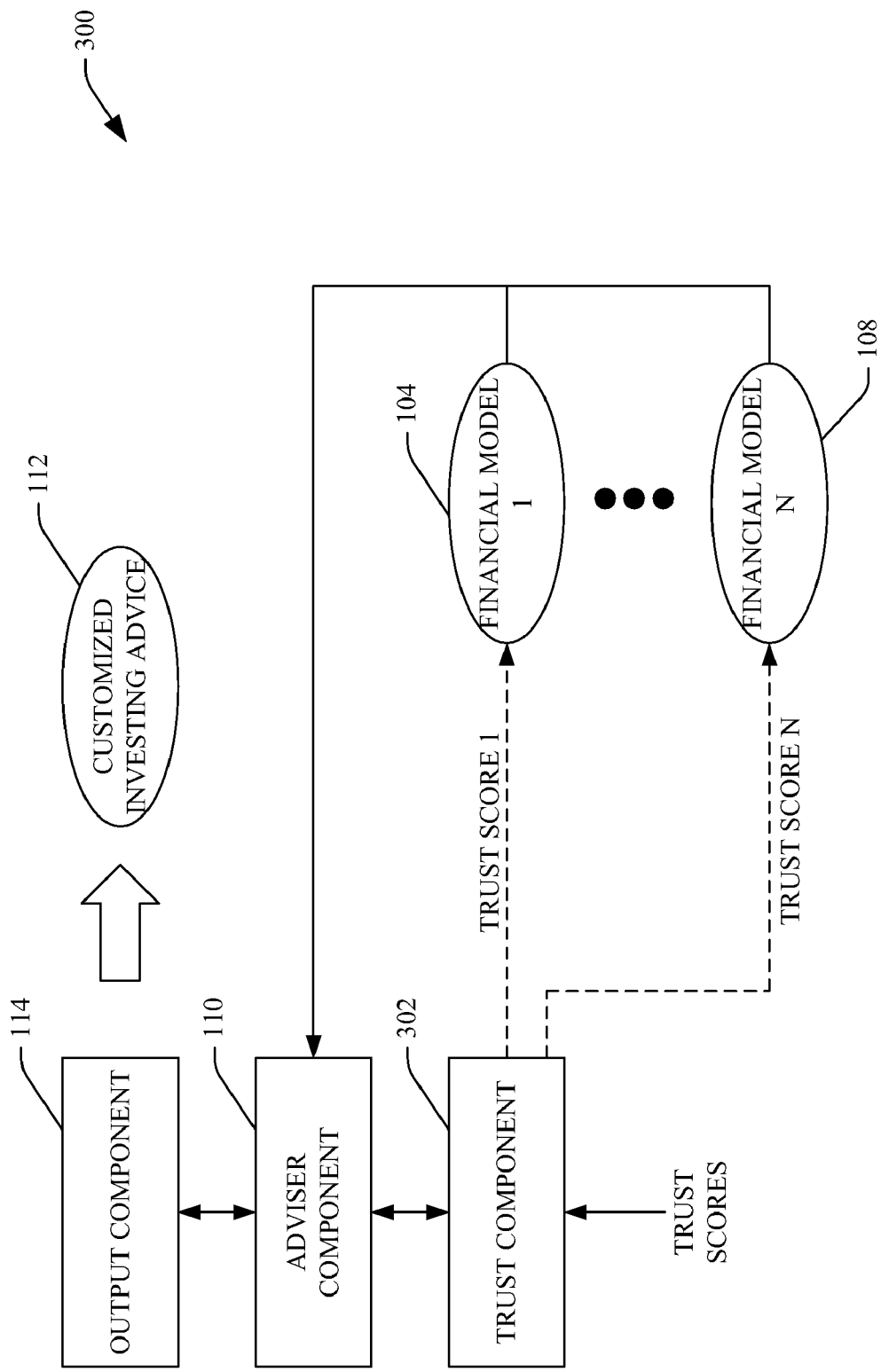
FIG. 3 is a functional block diagram of an example system that facilitates assigning trust scores to financial models, wherein the trust scores can be used in connection with determining customized investing advice.

Now referring to FIG. 3, an example system 300 that facilitates determining and outputting customized investing advice for a user is illustrated. The system 300 includes the financial models 104-108 that have been subscribed to by the subscriber component 102 (FIG. 1). The system 300 additionally includes a trust component 302 that receives an assignment of trust points from a user and assigns the received trust points to the financial models 104-108 in accordance with the received assignment from the user. For instance, a number of trust points assigned to a financial model may be indicative of a weight that is desirably assigned to financial data output by the financial model. Pursuant to an example, the user may desirably subscribe to the first financial model 104 and the Nth financial model 108, and such financial models may be human models that are configured to output advice from a first mutual fund manager and a second mutual fund manager, respectively. The user may wish that the customized investing advice 112 be based more on the advice from the first mutual fund manager than the advice from the second mutual fund manager. Accordingly, the user may wish to assign a greater number of trust points to the first financial model 104 than a number of trust points assigned to the Nth financial model 108. Pursuant to an example, a graphical user interface may be displayed to the user and may include a listing of financial models to which the user has subscribed. The user may then assign trust points (e.g., from a threshold number of available trust points) to the financial models by way of the graphical user interface.

The adviser component 110 can receive financial data output by the financial models 104-108, and can further receive trust scores that have been assigned to the financial models 104-108 by trust component 302 (e.g., based upon user input). The adviser component 110 can determine the customized investing advice 112 for the user based at least in part upon the trust scores assigned to the financial models 104-108. The output component 114 can output the customized investing advice 112 as described above.

Figure 4:
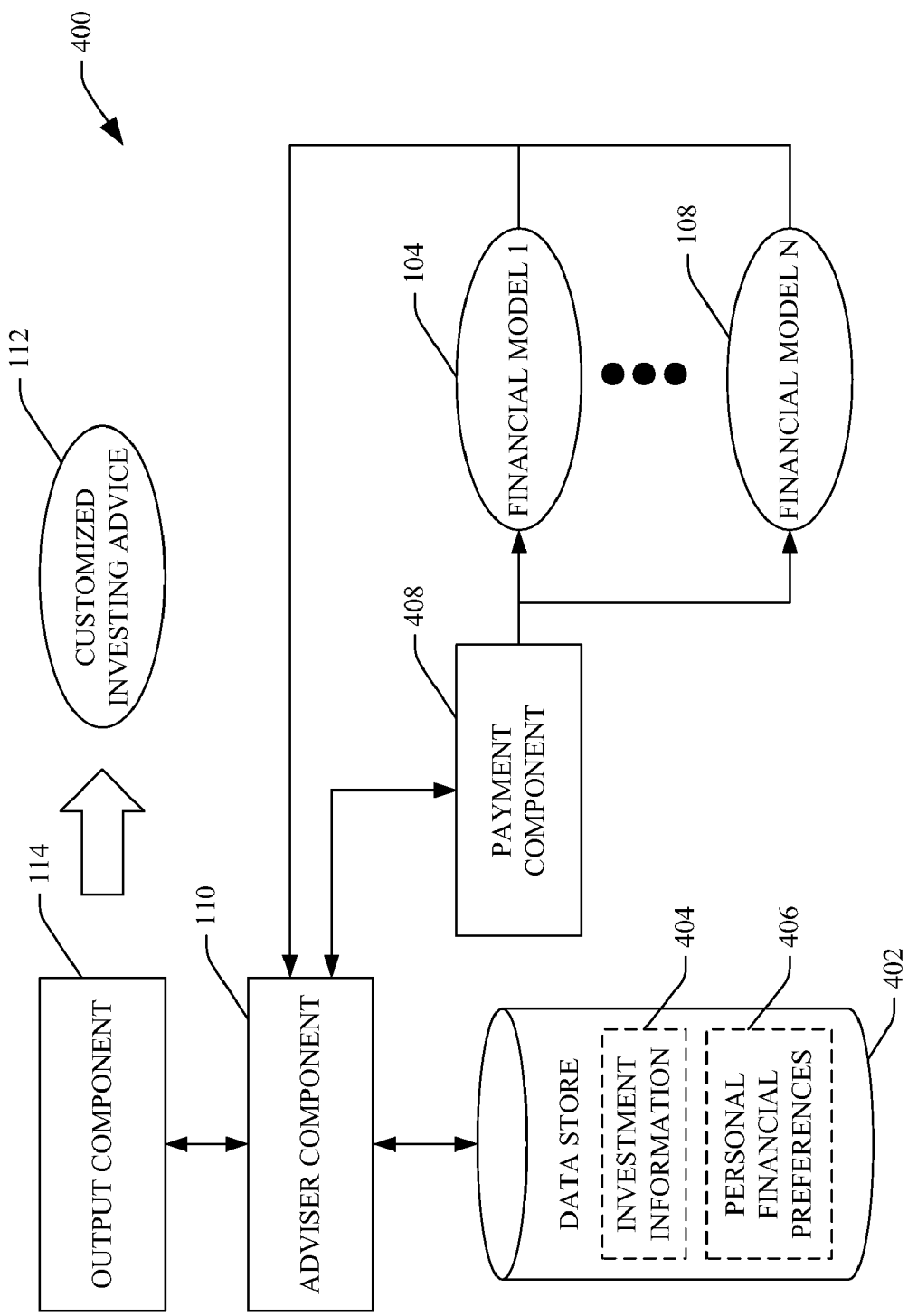
FIG. 4 is a functional block diagram of an example system that facilitates providing payment to financial models in return for financial data.

Referring now to FIG. 4, an example system 400 that facilitates determining and outputting customized investment advice for a user. The system 400 includes the adviser component 110 and the output component 114, which act in conjunction as described above. The system 400 additionally includes a data store 402 that includes investment information 404 and personal investing preferences 406. For instance, the data store 402 may reside on a personal computer with the adviser component 110. The investment information 404 can include information that is indicative of current investment holdings of the user, such as securities owned by the user, properties owned by the user, and/or the like. The adviser component 110 can determine the customized investing advice 112 based at least in part upon the investment information 404 (e.g., based at least in part upon the current investment holdings of the user).

The system 400 may further include a payment component 408 that facilitates allocation of monies to entities that own and/or maintain the financial models 104-108 that are subscribed to by the user. In an example, a fee for subscribing to any financial model may be substantially similar. In another example, a free market may exist, wherein entities that own and/or maintain the financial models 104-108 can independently set fees, and the user can take into consideration fees charged by such entities when subscribing to financial models. For instance, the payment component 408 can be linked to a checking or savings account of the user, and can facilitate initiating payment of fees to entities that own and/or maintain the financial models. The payment component 408 may, for instance, reside on a client computing device with the adviser component 110 or may reside on a server with a financial model. Pursuant to an example, an amount of a fee to be received by a financial model may be based at least in part upon a number of trust points assigned to such financial model (as discussed above with respect to FIG. 4). Moreover, an amount of monies allocated to the entities corresponding to the financial models 104-108 may be a percentage of an amount of monies invested by the user. In another example, the payment component 408 can assess a fee to the user for generating the customized investing advice 112.

Figure 5:
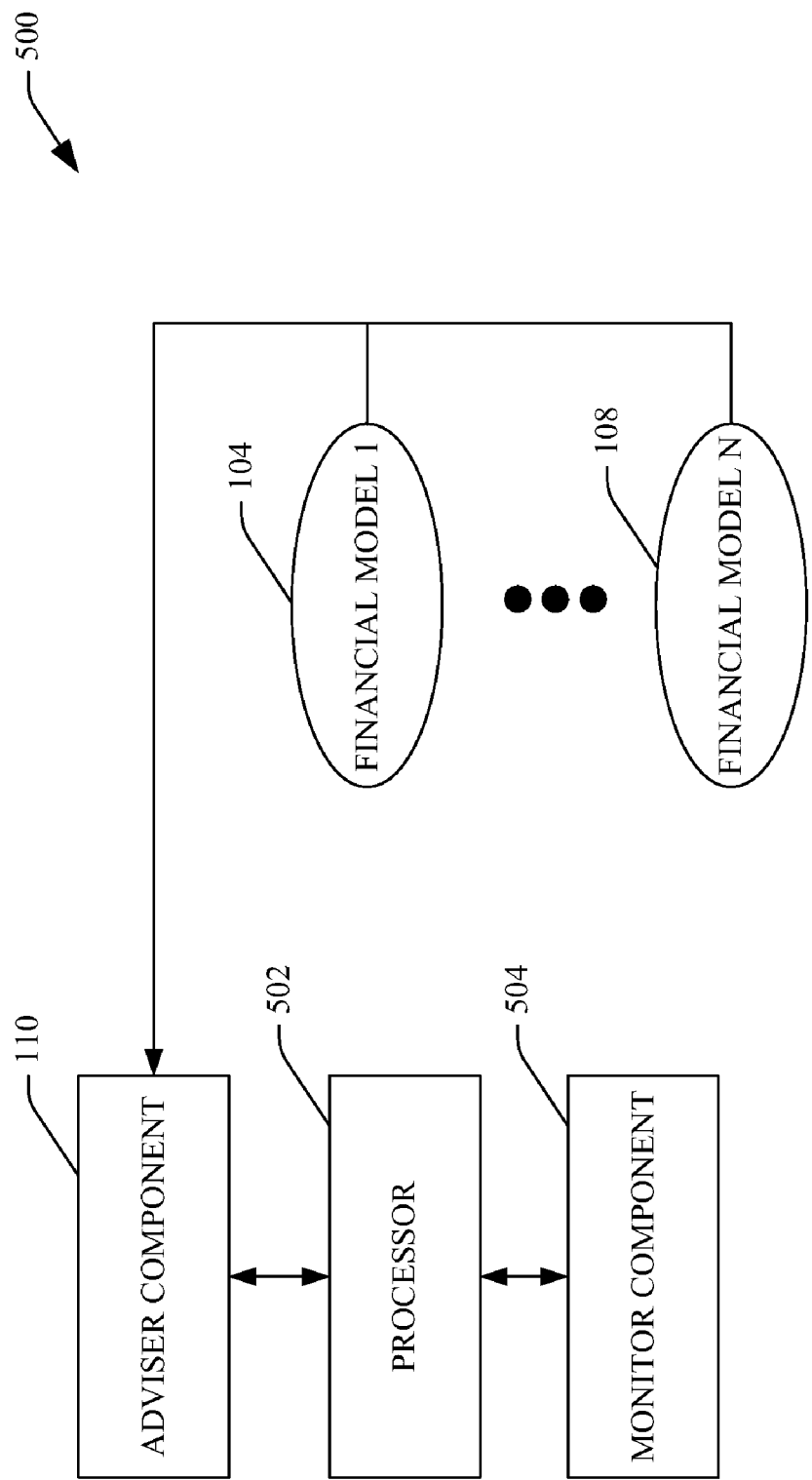
FIG. 5 is a functional block diagram of an example system that facilitates determining customized financial advice as a background task on a personal computing device.

Turning now to FIG. 5, an example system 500 that facilitates determining customized investing advice for a user is illustrated. The system 500 includes the adviser component 110 that receives financial data output by the financial models 104-108. The adviser component 110 determines customized investing advice for the user based at least in part upon data received from the financial models 104-108.

In the example system 500, the adviser component 110 may be or include computer-executable instructions that are retained in memory (not shown) of a personal computing device. The system 500 additionally includes a processor 502 that executes instructions in memory. For instance, the processor 502 can be a multi-core processor. Processing cycles can be assigned to various tasks on the personal computing device, including tasks that correspond to the adviser component 110. Pursuant to an example, the functionality corresponding to the adviser component 110 can be executed as a background task. More specifically, the system 500 can include a monitor component 504 that can monitor processing cycles of the processor 502 and can determine whether the processor 502 is executing a low priority task. If the processor is executing a low priority task, such as a system idle process, processing cycles can be allocated (e.g., by the monitor component 504) to the adviser component 110 based at least in part upon a determination that the processor is executing a low priority task. Accordingly, the adviser component 110 can process data from the financial models 104-108 while the user is utilizing a browsing application, a word processing application, and/or the like.

Figure 6:
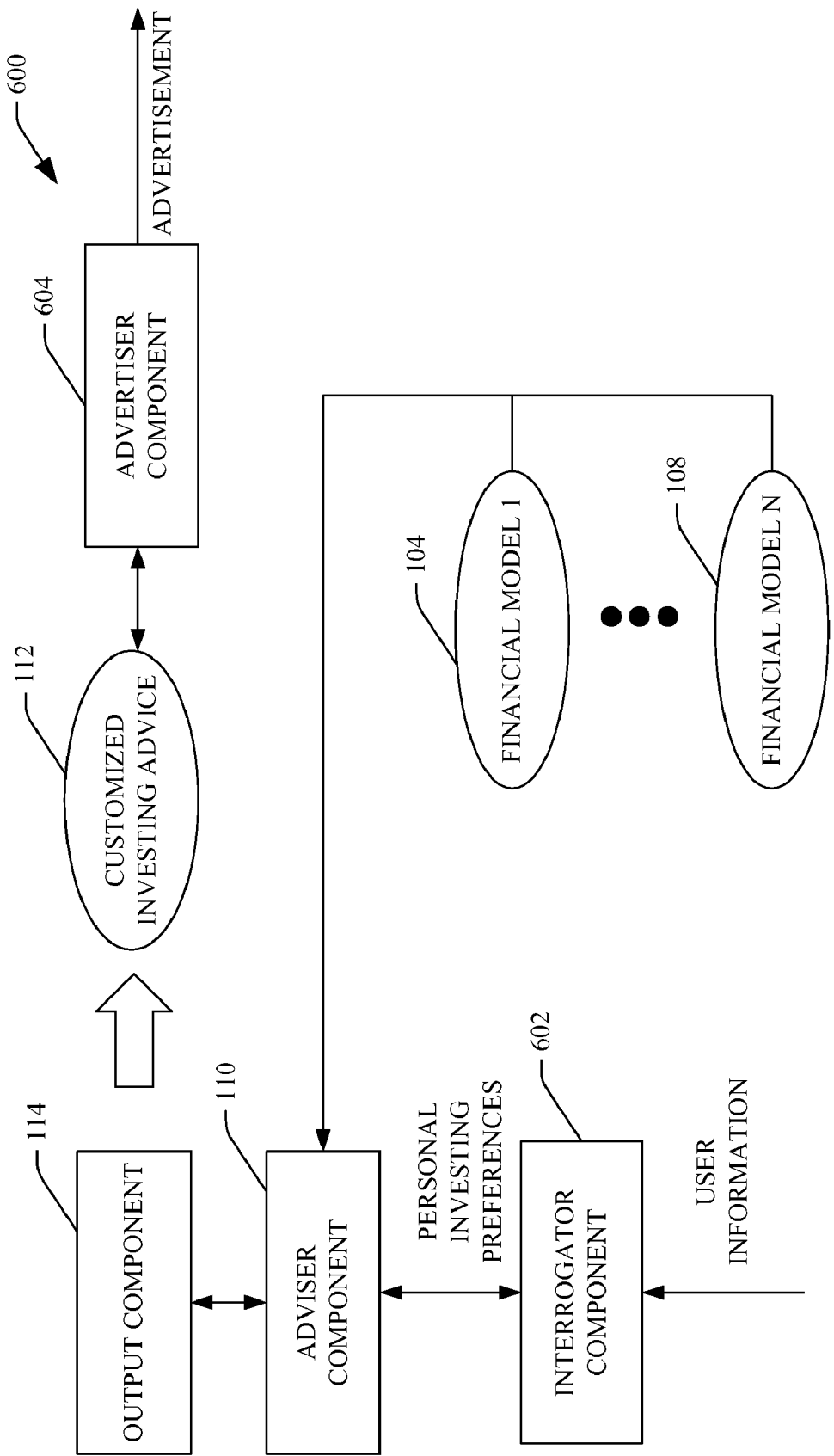
FIG. 6 is a functional block diagram of an example system that facilitates determining and outputting customized investing advice.

Now referring to FIG. 6, an example system 600 that facilitates determining and outputting customized investing advice for a user is illustrated. The system 600 includes the adviser component 110 that receives financial data output by the financial models 104-108, processes such data, and determines customized financial advice 112 for the user based at least in part upon personal investing preferences of the user. The output component 114 outputs the customized financial advice 112 as described above.

The system 600 may additionally include an interrogator component 602 that can interrogate the user with a plurality of questions pertaining to finances of the user to facilitate determining the personal investing preferences of the user. For instance, the interrogator component 602 can generate one or more graphical user interfaces that present one or more questions to the user, and the interrogator component 602 can receive answers to the questions from the user. For instance, the interrogator component 602 can output a wizard that can be employed by the user, wherein questions presented by the wizard may be based at least in part upon answers to previous questions. Information that may be obtained by the interrogator component 602 may include place of employment of the user, age of the user, current investment holdings of the user, whether the user has exercised stock options and/or has unexercised stock options, annual income of the user, whether the user has children, desired retirement age of the user, current debts of the user, risk tolerance of the user, amongst other information. This information may be explicitly provided by the user or inferred based upon responses to questions output by the interrogator component 602. Upon receiving answers to a subset of questions output by the interrogator component 602, the interrogator component 602 can output personal investing preferences of the user. As noted above, the adviser component 110 can receive the personal investing preferences of the user and determine the customized investing advice 112 based at least in part upon the personal investing preferences.

The system 600 may additionally include an advertiser component 604 that can provide an advertisement to display to the user based at least in part upon at least one of the financial models 104-108 subscribed to by the user, the personal investing preferences of the user, or the customized investing advice 112. For instance, if the customized investing advice 112 includes advice to purchase shares in a particular mutual fund, a manager of the mutual fund may wish to advertise to the user. In another example, the personal investing preferences of the user may include an indication that the user has a relatively low risk tolerance. Accordingly, a mutual fund that invests heavily in bonds may wish to advertise to the user.

With reference now to FIGS. 7-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 7:
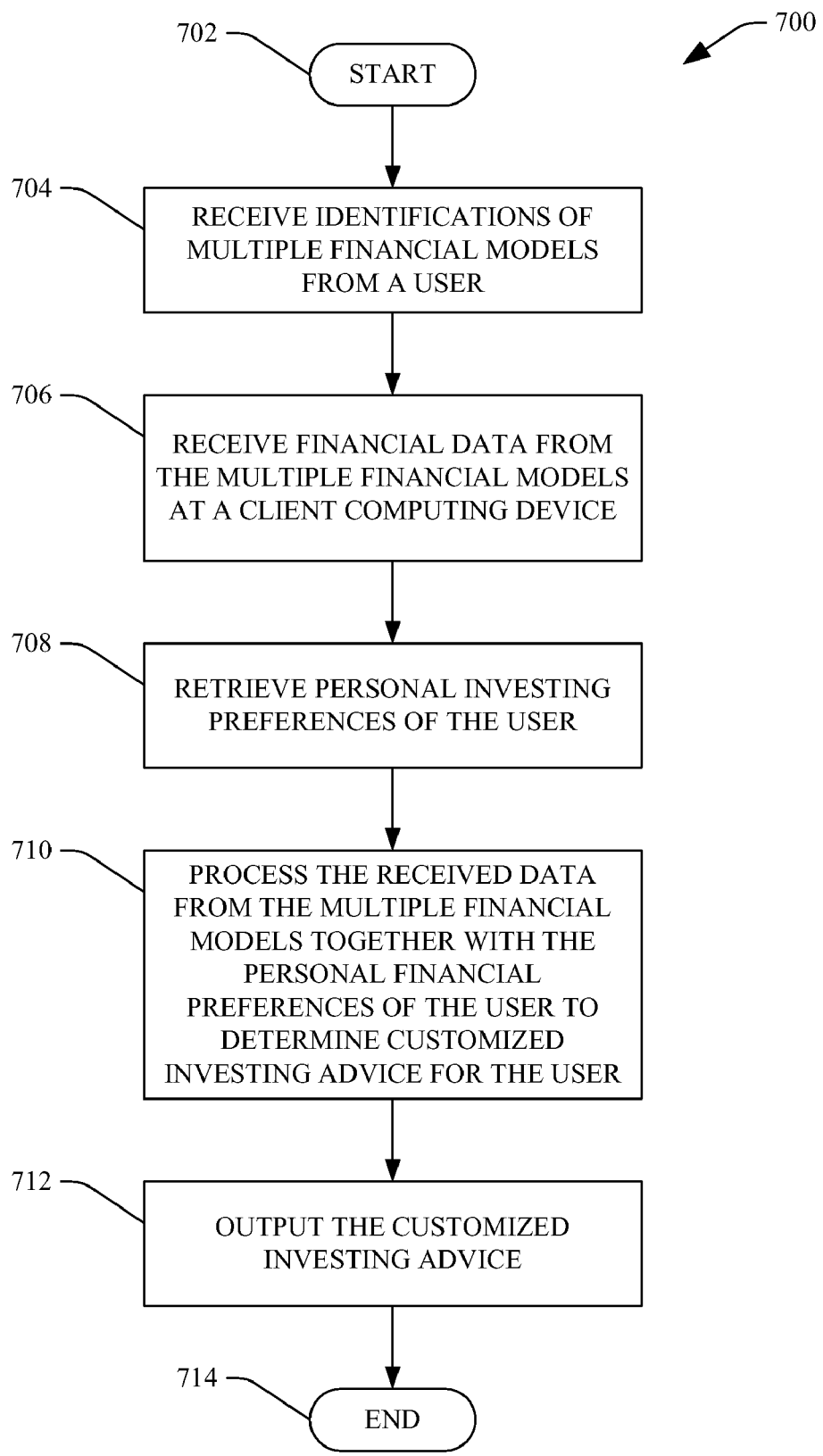
FIG. 7 is a flow diagram that illustrates an example methodology for determining and outputting customized investing advice.

Referring specifically to FIG. 7, an example methodology 700 that facilitates determining and outputting customized investing advice for a user is illustrated. The methodology 700 starts at 702, and at 704 identifications of multiple financial models are received from the user. For instance, a list of available financial models can be presented to the user, and the user can select a subset of the financial models. As noted above, the financial models identified by the user can include a human model, a data model, and/or a computational model. Furthermore, the identified financial models may reside on a server device.

At 706, financial data is received from the multiple financial models, wherein the financial data is received at a client computing device in real-time. At 708, personal investing preferences of the user are retrieved from a data store on the client computing device.

At 710, the received financial data from the financial models is processed together with the personal investing preferences of the user to determine customized investing advice for the user. In an example, the customized investing advice may include advice to buy or sell a particular security. At 712, the customized investing advice is output. For instance, the customized investing advice may be output to a graphical user interface, a computer-readable medium, etc. The methodology 700 then completes at 714.

Figure 8:
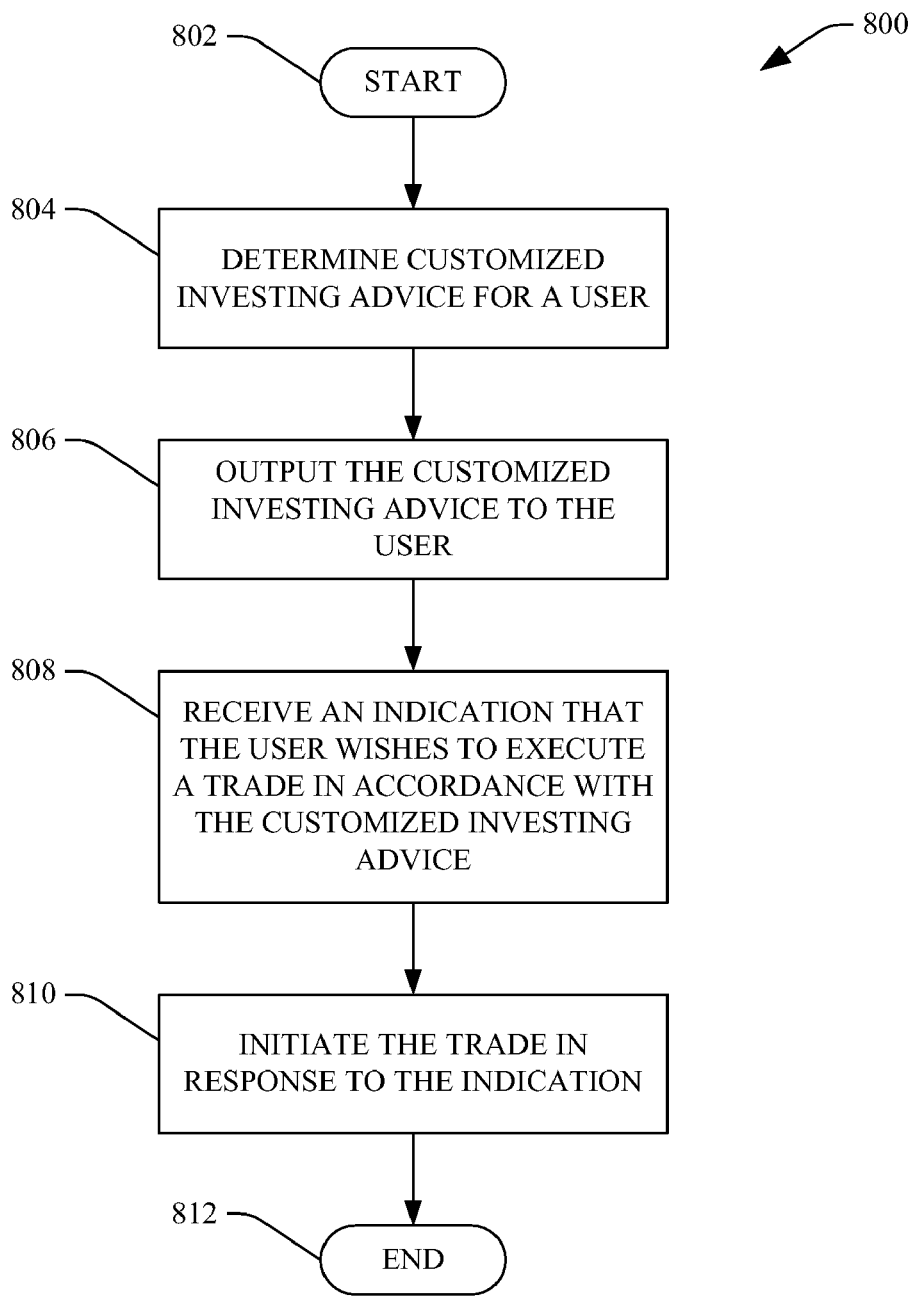
FIG. 8 is a flow diagram that illustrates an example methodology for initiating a trade based at least in part upon customized investing advice.

With reference now to FIG. 8, an example methodology 800 for automatically initiating a trade is illustrated. The methodology 800 starts at 802, and at 804 customized investing advice for a user is determined. The customized investing advice can be determined as described herein. At 806, the customized investing advice is output to the user. For instance, the customized investing advice can be presented to the user on a graphical user interface.

At 808, an indication that the user wishes to execute a trade in accordance with the customized investing advice is illustrated. For instance, a graphical user interface may include an option to initiate a trade that is advised in the customized investing advice.

At 810, the aforementioned trade is initiated in response to the indication. For instance, upon receiving the indication from the user, a website that facilitates executing a trade can be presented to the user in a browsing application. The user may then manually execute the trade. In another example, upon receiving the indication, a data packet can be transmitted to a trading application (e.g., resident upon a server) that includes instructions to execute the advised trade. The data packet can include instructions to transfer funds, buy or sell a particular security, etc. The methodology 800 completes at 812.

Figure 9:
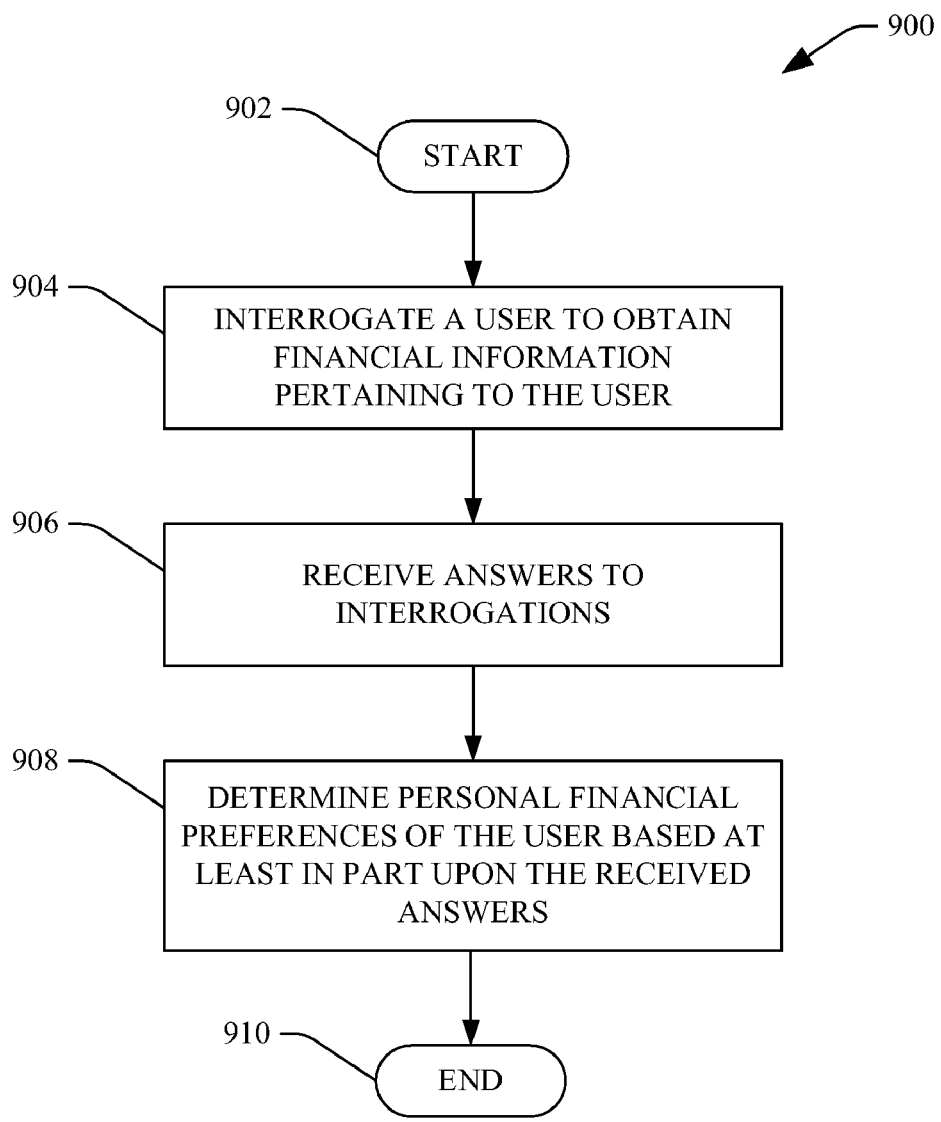
FIG. 9 is a flow diagram that illustrates an example methodology for determining personal investing preferences of a user.

Turning now to FIG. 9, an example methodology 900 for determining personal investing preferences of a user is illustrated. The methodology 900 starts at 902, and at 904 a user is interrogated to obtain financial information pertaining to the user. At 906, answers to the interrogations are received, and at 908 personal investing preferences of the user are determined based at least in part upon the received answers. The methodology 900 completes at 910.

Figure 10:
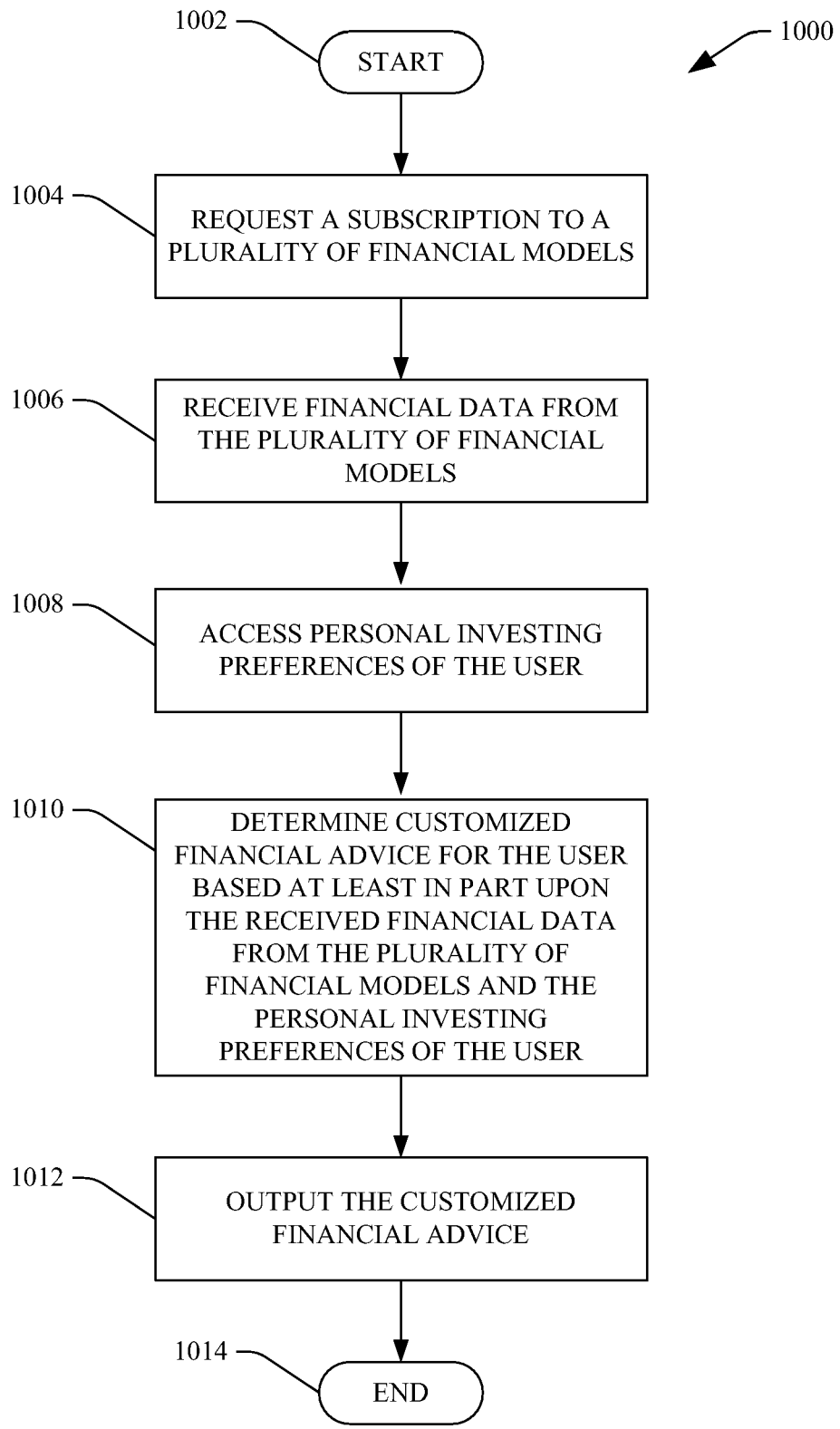
FIG. 10 is a flow diagram that illustrates an example methodology for determining and outputting customized investing advice.

With reference to FIG. 10, an example methodology 1000 for determining and outputting customized investing advice is illustrated. The methodology 1000 starts at 1002, and at 1004 a subscription to a plurality of financial models is requested, wherein the plurality of financial models have been identified by a user. For instance, the subscription can be requested in response to a user command. As noted above, the plurality of financial models can be configured to output financial information. Furthermore, the plurality of financial models can include at least one human model, wherein the at least one human model is configured to output financial advice from a financial expert as the financial expert gives the advice. Pursuant to an example, the financial expert can be a mutual fund manager, a hedge fund manager, or other suitable financial expert.

At 1006, financial data is received from the plurality of financial models. At 1008, personal investing preferences of the user are accessed (e.g., from a data store on a client computing device). The personal investing preferences of the user may include prohibitions on purchasing a particular security, prohibitions on an amount to be invested in a certain security, and other restrictions/preferences.

At 1010, customized investing advice is determined for the user based at least in part upon the received financial data from the plurality of financial models and the personal investing preferences of the user. At 1012, the customized financial advice is output. The methodology 1000 completes at 1014.

Figure 11:
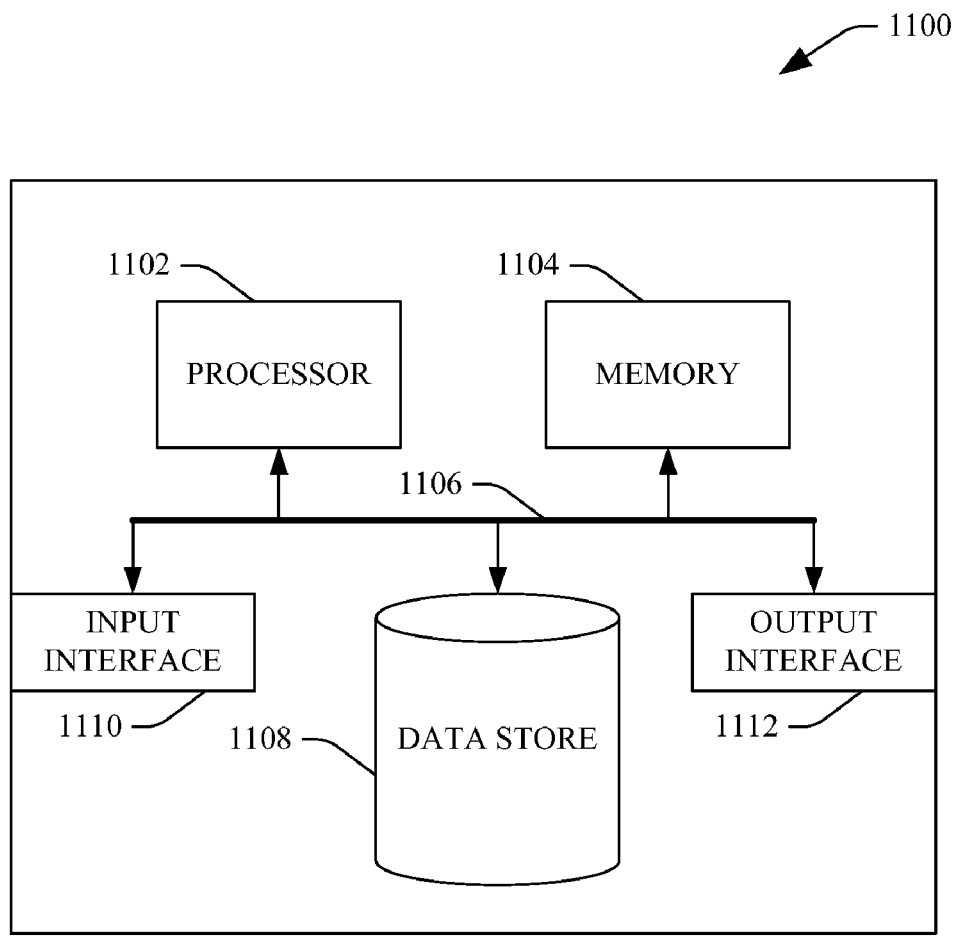
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that can be used in connection with determining and outputting customized investing advice for a user. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory by way of a system bus 1106. In addition to storing executable instructions, the memory 1104 may also store financial models, personal investing preferences, customized investing advice, identities of financial models, etc.

The computing device 1100 additionally includes a data store 1108 that is accessible by the processor 1102 by way of the system bus 1106. The data store 1108 may include executable instructions, identities of financial experts, customized investing advice, current investment holdings, etc. The computing device 1100 also includes an input interface 1110 that allows external devices to communicate with the computing device 1100. For instance, the input interface 1110 may be used to receive instructions from an external computer device, receive financial data from one or more financial models, etc. The computing device 1100 also includes an output interface 1112 that interfaces the computing device 1100 with one or more external devices. For example, the computing device 1100 may transmit an identification of a financial model to a server by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system that facilitates provision of personalized investing advice to a user comprises the following computer-executable components:

a subscriber component in a client computing device that receives a selection of multiple financial models from the user, wherein the user desires to receive financial data from the multiple financial models in real-time, wherein the multiple financial models include a human model that outputs financial advice from at least one financial expert in real-time, wherein the financial expert is a mutual fund manager;

an adviser component that receives and processes financial data output by the multiple financial models and determines customized investing advice for the user based at least in part upon the financial data output by the multiple financial models and personal investing preferences of the user;

a monitor component that is in communication with the adviser component that monitors a processor on the client computing device and allocates processing cycles to the adviser component if the processor is executing a low priority task; and an output component that outputs the customized investing advice.

2. The system of claim 1, wherein the multiple financial models include a data model that outputs data pertaining to market conditions in real-time.

3. The system of claim 1, wherein a personal computing device comprises the subscriber component and the adviser component, and wherein a server accessible to the system by way of a network comprises at least one of the multiple financial models.

4. The system of claim 3, wherein the personal computing device is one of a personal computer, a laptop computer, a personal digital assistant, a gaming console, or a portable telephone.

5. The system of claim 1, wherein the customized investing advice comprises advice to buy or sell a particular financial security.

6. The system of claim 1, further comprising a data store that includes information that is indicative of current investment holdings of the user, and wherein the adviser component determines the customized investing advice based at least in part upon the current investment holdings of the user.

7. The system of claim 1, further comprising a trust component that receives a desired assignment of trust points from the user and assigns the trust points to the multiple financial models based upon the received desired assignment, wherein trust points assigned to a first financial model are indicative of weights desirably assigned to data output by the first financial model, wherein the adviser component determines the customized investing advice for the user based at least in part upon the trust scores assigned to the multiple financial models.

8. The system of claim 1, wherein the adviser component executes in the background on the client computing device.

9. The system of claim 1, further comprising a payment component that automatically allocates monies to the multiple financial models in return for providing the financial data to the adviser component.

10. The system of claim 1, further comprising an advertiser component that provides an advertisement to display to the user based at least in part upon one or more of the financial models selected by the user, the personal investing preferences of the user, or the customized investing advice.

11. The system of claim 1, further comprising an interrogator component that interrogates the user with a plurality of questions pertaining to finances of the user to determine the personal investing preferences of the user.

12. The system of claim 1, wherein the financial advice includes advice to purchase a particular investment, wherein the personal investing preferences of the user comprise a prohibition against purchasing the particular investment, and wherein the customized financial advice does not include advice to purchase the particular investment.

13. A method for providing customized investing advice to a user, comprising the following computer-executable acts:
receiving, at a client computing device, an identification of multiple financial models from a user, wherein the multiple financial models reside on one or more server devices;
receiving financial data from the multiple financial models at the client computing device, wherein the multiple financial models include at least one human model, wherein financial data output by the human model comprises financial advice from a mutual fund manager, and wherein the financial advice from the mutual fund manager comprises advice to purchase a particular investment;
retrieving personal investing preferences of the user from a data store on the client computing device, wherein the personal investing preferences of the user includes a prohibition on purchasing the particular investment;
processing the received financial data from the multiple financial models together with the personal investing preferences of the user to determine the customized investing advice for the user on the client computing device, wherein the customized investing advice does not include advice for purchasing the particular investment; and
outputting the customized investing advice on the client computing device.

14. The method of claim 13, wherein the customized investing advice includes advice to execute a trade with respect to a security, and further comprising:
receiving an indication that the user wishes to execute the trade in accordance with the customized investing advice; and
initiating the trade in response to receiving the indication.

15. The method of claim 13, further comprising assessing a fee to the user in return for outputting the customized investing advice.

16. The method of claim 13, wherein the act of processing is executed in the background on the client computing device.

17. The method of claim 13, further comprising:
monitoring a processor on the client computing device; and
allocating processing cycles to process the received financial data if the processor is executing a low priority task.

18. The method of claim 13, further comprising causing an advertisement to be displayed on a display screen of the client computing device based at least in part upon the customized investing advice.

19. The method of claim 13, further comprising:
receiving a desired assignment of trust points from the user; and
assigning the trust points to the multiple financial models based upon the received desired assignment, wherein trust points assigned to a first financial model are indicative of weights desirably assigned to data output by the first financial model, wherein the customized investing advice is determined based at least in part upon the trust scores assigned to the multiple financial models.

20. A method comprising the following computer-executable acts:
requesting a subscription to a plurality of financial models, wherein the plurality of financial models have been identified by a user, wherein the plurality of financial models are configured to output financial data, and wherein the plurality of financial models include at least one human model that is configured to output financial advice from a financial expert as the financial expert gives the financial advice, wherein the financial expert is a mutual fund manager, wherein the financial advice includes advice to purchase a particular investment, and wherein at least a subset of the financial models reside on a server that is accessible to the client computing device by way of the Internet;
receiving financial data from the plurality of financial models, wherein financial data received from the at least one human model comprises transactions made by the mutual fund manager when managing a mutual fund in real-time;

accessing personal investing preferences of the user, wherein the personal investing preferences of the user include a prohibition against purchasing the particular investment;

determining customized investing advice for the user based at least in part upon the received financial data from the plurality of financial models and the personal investing preferences of the user, wherein determining the customized investing advice is undertaken as a background task on the client computing device, and wherein the customized investing advice does not include advice for purchasing the particular investment; and outputting the customized financial advice.

* * * * *